United States Patent [19]

Boden

[11] 4,288,891
[45] Sep. 15, 1981

[54] CORD LOCK HAVING DEPRESSABLE PLUNGER

[76] Inventor: Ogden W. Boden, 1580 Gaywood Dr., Altadena, Calif. 91101

[21] Appl. No.: 775,170

[22] Filed: Mar. 7, 1977

[51] Int. Cl.³ .............................................. F16G 11/00
[52] U.S. Cl. .................................................. 24/115 G
[58] Field of Search ............ 24/115 G, 136 R, 136 B; 403/211, 374

[56] References Cited

U.S. PATENT DOCUMENTS 2,457,195  12/1948  Bagnall, Jr. ...................... 24/115 G
3,845,575  11/1974  Boden ................................ 24/136 R

FOREIGN PATENT DOCUMENTS 1276059  10/1961  France ............................... 24/115 G
   6899  of 1901  United Kingdom ................ 403/211

Primary Examiner—Kenneth Dorner
Attorney, Agent, or Firm—William P. Green

[57] ABSTRACT

A cord lock having a body containing a plunger which can be pressed inwardly relative to the body against the resistance of an actuating spring, with the body and plunger having apertures through which a cord or cords can extend and which have edges acting to grip the cords when the plunger is in a predetermined locking position. The apertures are desirably of oblong sectional shape, and the gripping edges of the plunger and body are preferably sharpened in a relation assuring effective clamping of the cord.

13 Claims, 10 Drawing Figures

CORD LOCK HAVING DEPRESSABLE PLUNGER

BACKGROUND OF THE INVENTION

This invention relates to improved cord locking devices for retaining a cord or cords against longitudinal movement relative to the unit.

One type of cord lock currently on the market includes two essentially cup-shaped elements having telescopically interfitting cylindrical side walls one of which is slidably movable into and out of the other, with a spring resisting movement of the par'ʃ relatively together. The two cylindrical side walls contain apertures which are moveable to positions of alignment when the two elements are pressed relatively together, and through which apertures a cord or cords can extend, with the cords being locked against longitudinal movement relative to the interfitting parts when the latter are released for limited separating movement under the influence of the spring. The side wall apertures in the two cylindrical parts are of substantially circular configuration.

SUMMARY OF THE INVENTION

The cord locking devices of the present invention are of the above discussed general type, but incorporate improvements enabling the device as a whole to be reduced considerably in size, and as a result be more convenient and more easily handled and manipulated in use. In addition, a unit embodying the invention is capable of gripping a cord more effectively than the discussed prior art arrangements, to resist longitudinal movement of the cord or cords relative to the device with a greater locking force. A particular feature of the invention resides in the construction of the two relatively movable parts in a manner minimizing the amount of relative movement required between released and locking conditions.

A device embodying the invention includes a body having a passage in which a plunger is slidably movable along an axis, and containing apertures which can be moved into essential alignment to pass a cord, as discussed above, with the plunger being spring urged outwardly relative to the body to locking position. The configuration of the apertures in the body and plunger is of considerable significance in limiting the range of movement which is required of the plunger relative to the body. To minimize such movement, the apertures are formed to be of oblong or elongated outline configuration rather than the circular shape of the prior art units. The narrow dimension of the openings extends in the direction of axial movement of the plunger, while the greater dimension of the opening is essentially in a plane disposed generally transversely of the axis. With such elongated apertures in the plunger and body, very little plunger movement is required whether one cord or two cords may be passed through the device.

To maximize the gripping effectivenesss of the plunger and body on the cord or cords, the gripping edges which are formed on these units and define edges of the cord passing apertures are shaped to have sharpened sectional configuration, to thereby bite into the cords and very positively resist their longitudinal movement. Preferably, the spring retains the body and plunger against separation when no cord is present. dr

BRIEF DESCRIPTION OF THE DRAWINGS

The above and other features and objects of the invention will be better understood from the following detailed description of the typical embodiments illustrated in the accompanying drawings in which.

DESCRIPTION OF THE PREFERRED EMBODIMENTS

The first form of locking device 10 which is illustrated FIGS. 1 to 6 is typically illustrated as utilized for locking a single cord 11 against longitudinal movement relative to the device. However, this device 10 may also be utilized for locking two side by side cords against longitudinal movement, in the manner illustrated in conjunction with the second form of the invention shown in FIGS. 8 to 10. Also, the device 10a of FIGS. 8 to 10 can be employed for holding a single cord as in FIGS. 1 to 6.

Figure 1:
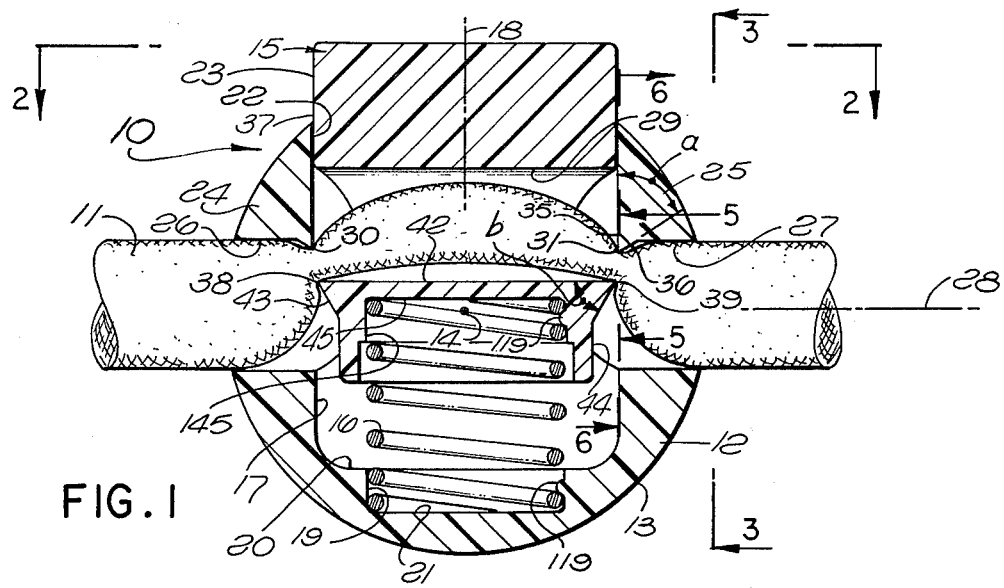
FIG. 1 is a central section through a first form of cord locking device constructed in accordance with the invention.
Figure 2:
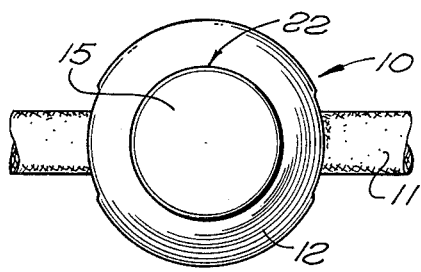
FIG. 2 is a reduced plan view taken on line 2—2 of FIG. 1.

As seen best in FIG. 1, the device 10 includes an outer body 12, preferably having an external spherical surface 13 centered about the point 14. A plunger 15 is manually depressable from the locking position of FIG. 1 to the cord releasing position of FIG. 4 against the tendency of a return spring 16.

Internally, the spherical body 13 contains a cylindrical passage 17 centered about an axis 18 which is vertical in FIG. 1 and which extends diametrically with respect to spherical surface 13 and extends through the center 14 of that surface. A counterbore 19 is formed at the lower end of cylindrical passage 17, with an annular transverse shoulder 20 between the main passage and counterbore, and with the body passage being closed at its lower end by a transverse shoulder 21 against which the lower end of compression coil spring 16 bears.

The upper end of cylindrical passage 17 in the body opens upwardly to the exterior of the body, through a circular opening 22, within which the plunger 15 is slidably received. At its upper end, the plunger has a portion 23 projecting upwardly beyond the body and accessible for engagement by the thumb or finger of a user to depress the plunger.

At opposite sides of the plunger as viewed in FIG. 1, the two side wall portions 24 and 25 of body 12 contain a pair of aligned apertures 26 and 27 extending along and centered about an axis 28 which extends diametrically with respect to spherical surface 13 and through center 14 and is perpendicular to and intersects plunger axis 18. The plunger also contains an aperture 29 which in the FIG. 4 position of the plunger is aligned with apertures 26 and 27 and centered about the same axis 28. All three of the apertures 26, 27 and 29 are of identical cross section transversely of axis 28 except insofar as the tops of the apertures 26 and 27 are altered slightly to provide two essentially sharp gripping edges 30 and 31, which edges are curved as in FIG. 6 to have their highest points at their centers for urging an engaged cord or cords toward a centered location. As seen in FIGS. 5 and 6, the apertures 26, 27 and 29 are of oblong rather than circular cross sectional configuration transversely of axis 28, to have vertical dimensions x which are relatively small, and horizontal dimensions y which are greater than dimension x and typcially equal to approximately twice the height dimension x. The cord or cords 11 to be locked by the device may have a normal diameter corresponding approximately to the dimension x. Apertures 26, 27 and 29 may have rounded ends at 32 and 33 (FIG. 3).

Figure 3:
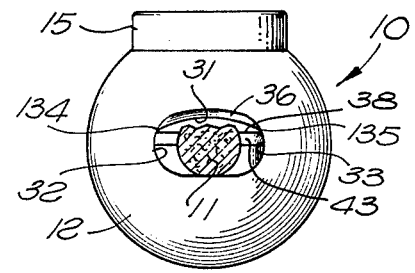
FIG. 3 is a side view taken on line 3—3 of FIG. 1, with the cord partially broken away to better reveal the structure of the other parts.

The two apertures 26 and 27 are of uniform cross section transversely of axis 28 along their entire left to right extents (as viewed in FIG. 1), except that at the locations of the gripping edges 30 and 31, adjacent inner cylindrical surface 17 of the body, the top walls of apertures 26 and 27 project downwardly (across the entire lateral extent of the top of each of these apertures between the two locations 134 and 135 of FIGS. 3 and 6). The edge 31 is defined by two surfaces which converge toward one another and merge at the sharpened extremities of the edges, and which are disposed at an angle a to one another which is substantially less than 90 degrees. The two surfaces thus referred to are the inner cylindrical surface 17 of the body 35, and an inclined surface 36 extending downwardly and inwardly toward edge 31. The second edge 30 has the same sharpened sectional configuration.

Plunger 15 has a cylindrical external surface 37 which is a fairly close fit within and slidably engages cylindrical body surface 17 to effectively guide plunger 15 for the desired movement upwardly and downwardly along axis 18 relative to the body. This cylindrical surface 37 on the plunger continues downwardly to the lower end of plunger 15, except as that surface is interrupted at the locations of intersection of the opposite ends of aperture 29 with surface 37, and at the locations of recesses 44 beneath the opposite ends of aperture 29 where the plunger is shaped to form edges 38 and 39 of sharpened sectional configuration. These edges extend laterally between the locations 40 and 41 of FIG. 5, and like edges 30 and 31 are defined by surfaces converging together at an angle b substantially less than 90 degrees. The upper of these converging surfaces is formed by the bottom surface of aperture 29 at 42, while the second surface 43 extends downwardly and radially inwardly from edge 38 or 39 to a reduced diameter cylindrical surface 144 of the corresponding recess 44. The upper end of spring 16 is received and located within a downwardly facing recess 45 formed in the underside of the plunger and is a close fit within a cylindrical bore 145 formed in the top of this recess.

The upper and lower ends of the spring are desirably connected to the plunger and body respectively in a manner retaining the upper end of the spring against separation from the plunger and retaining the lower end of the spring against separation from the body, to thus secure the plunger and body together through the spring when no cord is present. For this purpose, the spring may be a tight friction fit within each of the bores 19 and 145, and preferably these bores also have small typically rounded detent projections or lugs 119 (FIGS. 1, 4 and 4a) extending radially inwardly a short distance at one or more points about the periphery of the spring, to a diameter requiring that the end turns of the spring snap past lugs 119 upon initial assembly of the parts to lock the parts together as discussed.

Figure 4:
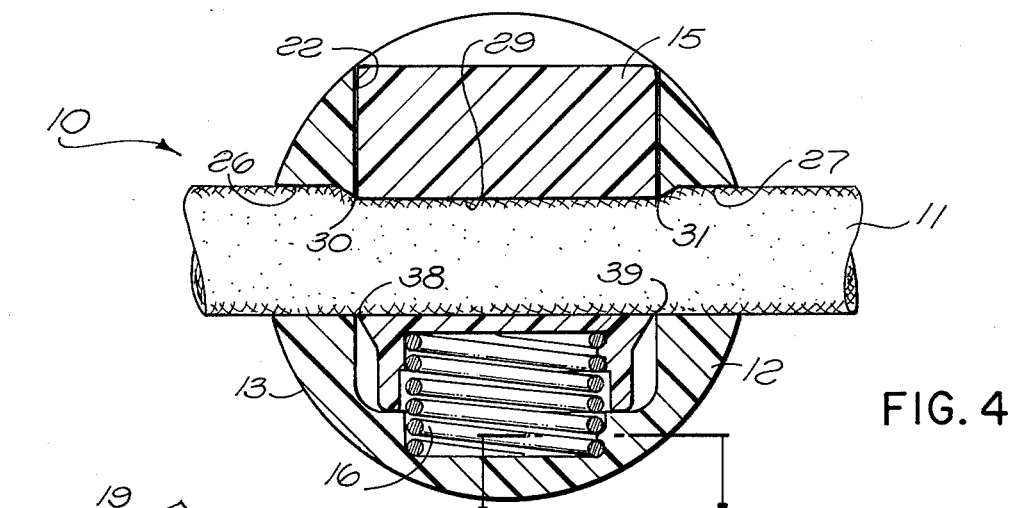
FIG. 4 is a reduced scale view similar to FIG. 1, showing the device in its cord releasing condition.
Figure 4A:
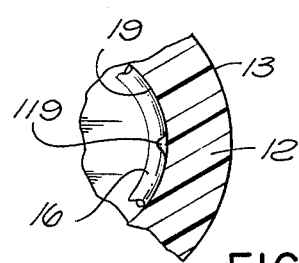
FIG. 4a is a view taken on the line 4a—4a of FIG. 4 illustrating the lower spring retainer.
Figure 5:
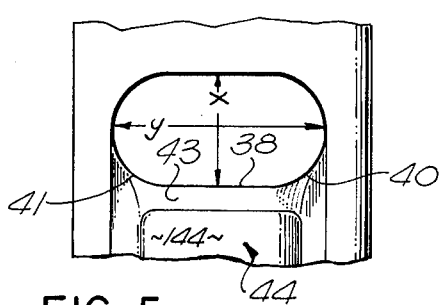
FIGS. 5 and 6 are fragmentary sections taken on lines 5—5 and 6—6 respectfully of FIG. 1.
Figure 6:
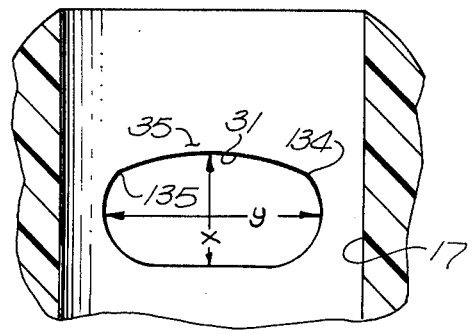

In using the device of FIGS. 1 to 6, a person first presses plunger 15 downwardly against the tendency of the compression spring 16 from the FIG. 1 position to the FIG. 4 position in which apertures 26, 27 and 29 are aligned with one another along axis 28. In that condition, a cord or pair or cords 11 can be inserted easily through the apertures 26, 27 and 29, and upon subsequent release of plunger 15 the spring 16 urges the plunger upwardly to the FIG. 1 position to tightly clamp the cord or cords between body edges 30 and 31 and plunger edges 38 and 39. In that condition, the sharp edges 30, 31, 38 and 39 tend to bite into the cord and grip it in a manner very positively locking the cord or cords against longitudinal movement. Also, the relatively small dimension x of the apertures in the direction of axis 18 assists in minimizing the amount of movement required of the plunger between its locking and released conditions.

Figure 7:
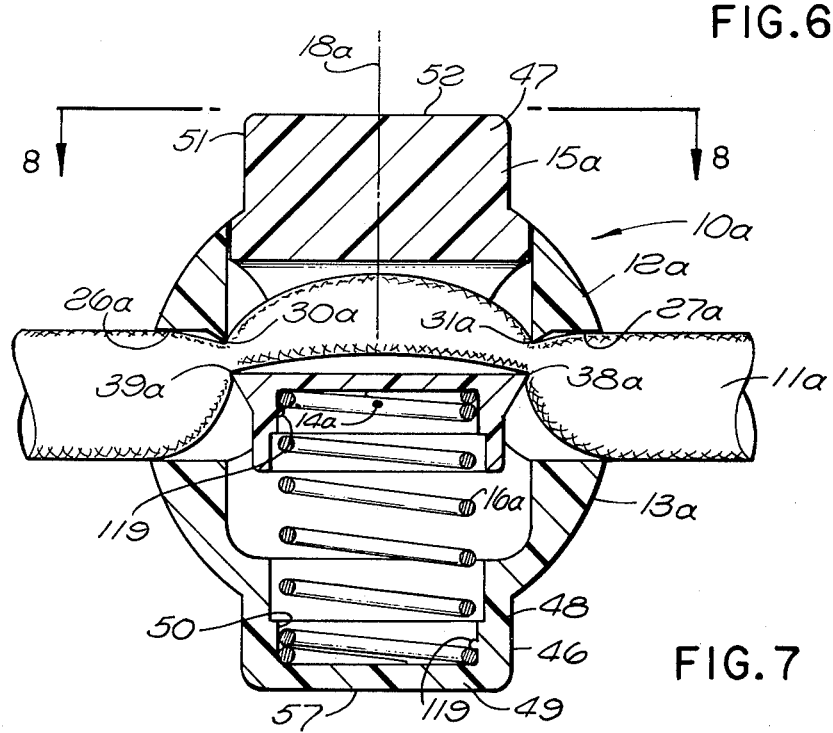
FIG. 7 is a view similar to FIG. 1, but showing a variational form of the invention.
Figure 8:
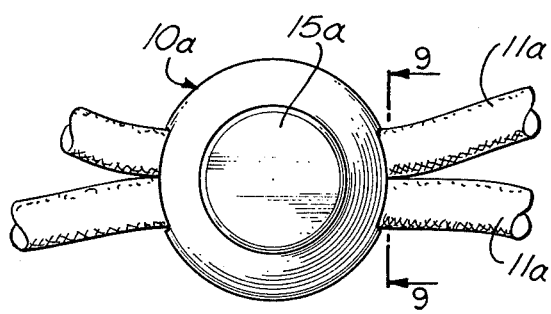
FIG. 8 is a reduced scale plan view taken on line 8—8 of FIG. 7.
Figure 9:
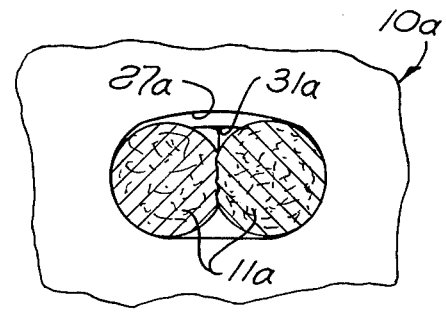
FIG. 9 is a view taken on line 9—9 of FIG. 8.

The variational form of the invention illustrated at 10a in FIGS. 7 to 9 is structurally very similar to the device 10 of FIG. 1 except for a reduction in external diameter of the outer spherical surface 13a of body 12a, and the provision of a projection 46 at the lower end of the body and of a size and shape similar to a projection 47 at the upper end of the plunger 15a. Projection 46 is essentially cylindrical, being defined by a cylindrical side wall 48 centered about the main axis 18a of plunger movement, and having a transverse end wall 49 normal to axis 18a. The lower end of spring 16a can then project downwardly into, and be frictionally or otherwise retained within, the cylindrical recess formed in the interior of hollow projection 46 of the body, and bear against bottom wall 49 to allow the use of a fairly long spring in spite of the small diameter of the main spherical surface 13a of the body. The upper end of the spring bears against and is frictionally or otherwise secured to the plunger in the same manner discussed in connection with the first form of the invention, and tends to urge the plunger to the locking position illustrated in FIG. 7. As will be apparent, the springs 16 and 16a of both forms of the invention of course are still under compression in the locking condition of FIGS. 1 and 7, and when the cords are not present these springs will urge the plungers upwardly well beyond the illustrated positions and to locations in which the plunger aperture is completely upwardly beyond the body apertures, with the close fits at both ends of spring retaining the three parts together even when no cord is present.

The projection 47 formed at the upper end of plunger 15a of FIGS. 7 to 9 is of externally cylindrical configuration corresponding essentially to that of the lower projection 46, and in particular may have an outer cylindrical surface 51 centered about axis 18a and of a diameter corresponding to the outer surface of side wall 48 of projection 46. The top of projection 47 may be defined by a flat surface 52 disposed transversely of axis 18a, and disposed parallel to the undersurface 57 of projection 46, with these surfaces being spaced a common distance radially outwardly from center 14a. The apertures 26a, 27a, and 29a of FIG. 7 may be shaped essentially the same as apertures 26, 27 and 29 of FIG. 1, and the sharp gripping projections 30a, 31a, 38a and 39a may also be shaped essentially the same as the corresponding projections of FIG. 1 and serve the same purpose.

The use of the FIG. 7 device is the same as discussed in connection with FIG. 1, but as previously indicated we have typically illustrated in FIGS. 7 to 9 the use of the device in conjunction with two cords 11a, rather than the single cord 11 of FIG. 1. As seen in FIG. 1, each of the two cords preferably has a normal external diameter corresponding approximately to the vertical extent of the apertures 26a, 27a, and 29a. The horizontal extent of the apertures, being preferably approximately twice as great as the diameter of the individual cords, as dimensioned to easily but fairly closely receive and confine the two cords 11a in side-by-side relation, so that these cords when first passed through the apertures will occupy approximately the entire cross sectional area of the apertures, and will then be compressed and tightly clamped when the plunger is released to the FIG. 7 condition.

While certain specific embodiments of the present invention have been disclosed as typical, the invention is of course not limited to these particular forms, but rather is applicable broadly to all such variations as fall within the scope of the appended claims.

I claim:

1. The combination comprising:
   a body containing a passage;
   a plunger mounted slidably in said passage for movement relative to said body along a predetermined axis, and having an end portion which is accessible from the outside of the body for manually pressing the plunger inwardly along said axis from a cord gripping position to a released position; and
   a spring yieldingly resisting such inward axial sliding movement of the plunger;
   said body and plunger having apertures through which a cord or cords can extend generally transversely of said axis and which in said released position of the plunger are essentially opposite one another to free the cord or cords for longitudinal movement, and which are defined in part by relatively movable edges of the body and plunger between which the cord or cords are clamped in said gripping position of the plunger to lock the cord or cords against longitudinal movement;
   at least one of said edges, as viewed in planes containing said axis and extending through a corresponding one of said apertures in the vicinity of its center, being of sharpened sectional configuration defined by faces which converge toward one another at an acute angle substantially less than 90 degrees.

2. The combination as recited in claim 1, in which all of said edges of the plunger and body which clamp the cord in said gripping position are shaped, as viewed in planes containing said axis and extending through said apertures in the vicinity of their centers, to have sharpened sectional configurations defined by faces which converge toward one another at acute angles substantially less than 90 degrees.

3. The combination as recited in claim 1, in which one of said edges is formed on said plunger at an axially inner side of the aperture formed in said plunger and projects farther laterally toward a side of said passage than does an axially inwardly adjacent portion of the plunger in a relation giving to said edge formed on the plunger, as viewed in axial section, a sharpened configuration defined by two faces converging toward one another at an acute angle substantially less than 90 degrees.

4. The combination as recited in claim 1, in which said body has a side wall at one side of the plunger forming one of said edges adjacent said passage, with said one edge being of sharpened configuration defined by two faces converging toward one another at an acute angle substantially less than 90 degrees.

5. The combination as recited in claim 1, in which said body has two opposite side walls containing two of said apertures and forming two of said edges at essentially the inside of said walls, which edges project axially inwardly in a relation having sharpened axial section configurations defined by faces merging toward one another at an acute angle substantially less than 90 degrees, said plunger containing one of said apertures extending between said side walls of the body and having two of said edges at axially inner sides of said aperture in the plunger, which edges project laterally farther than axially inwardly adjacent portions of the plunger in a relation giving said edges of the plunger sharpened axial sectional configurations defined by faces converging toward one another at acute angles substantially less than 90 degrees.

6. The combination as recited in claim 5, in which said body has an outer spherical surface, said passage being cylindrical and extending diametrically of said spherical surface, said plunger having an externally cylindrical surface which is a close sliding fit within said cylindrical passage in the body.

7. The combination comprising:
   a body containing a passage;
   a plunger mounted slidably in said passage for movement relative to said body along a predetermined axis, and having an end portion which is accessible from the outside of the body for manually pressing the plunger inwardly along said axis from a cord gripping position to a released position; and
   a spring yieldingly resisting such inward axial sliding movement of the plunger;
   said body and plunger having apertures through which a cord or cords can extend generally transversely of said axis and which in said released position of the plunger are essentially opposite one another to free the cord or cords for longitudinal movement, and which are defined in part by relatively movable edges of the body and plunger between which the cord or cords are clamped in said gripping position of the plunger to lock the cord or cords against longitudinal movement;
   said spring being a coil spring having opposite end portions which are close fits in said body and plunger respectively;
   said body and plunger having detent shoulders past which said opposite end portions of the spring snap upon assembly, to connect the spring to both the body and plunger and thereby retain the body and plunger against separation when no cord is received in said apertures.

8. The combination comprising:
   a body containing a passage;
   a plunger mounted slidably in said passage for movement relative to said body along a predetermined axis, and having an end portion which is accessible from the outside of the body for manually pressing the plunger inwardly along said axis from a cord gripping position to a released position; and a spring yieldingly resisting such inward axial sliding movement of the plunger;

said body and plunger having apertures through which a cord or cords can extend generally transversely of said axis and which in said released position of the plunger are essentially opposite one another to free the cord or cords for longitudinal movement, and which are defined in part by relatively movable edges of the body and plunger between which the cord or cords are clamped in said gripping position of the plunger to lock the cord or cords against longitudinal movement;

said apertures in the body and plunger being of oblong cross sectional configuration having a smaller dimension in a direction parallel to said axis than in a plane transversely of the axis;

at least one of said edges as viewed in planes containing said axis and extending through approximately the center of a corresponding one of said apertures being of sharpened cross section defined by two faces converging toward one another at an acute angle substantially less than 90 degrees.

9. The combination comprising:

a body containing a passage;

a plunger mounted slidably in said passage for movement relative to said body along a predetermined axis, and having an end portion which is accessible from the outside of the body for manually pressing the plunger inwardly along said axis from a cord gripping position to a released position; and a spring yieldingly resisting such inward axial sliding movement of the plunger;

said body and plunger having apertures through which a cord or cords can extend generally transversely of said axis and which in said released position of the plunger are essentially opposite one another to free the cord or cords for longitudinal movement, and which are defined in part by relatively movable edges of the body and plunger between which the cord or cords are clamped in said gripping position of the plunger to lock the cord or cords against longitudinal movement;

said apertures in the body and plunger being of oblong cross sectional configuration having a smaller dimension in a direction parallel to said axis than in a plane transversely of the axis;

one of said edges being formed on said plunger at the periphery thereof and projecting farther laterally toward a side wall of said passage than does another axially adjacent portion of the plunger;

said one edge having, as viewed in a plane containing said axis and extending through a central portion of a corresponding one of said apertures, a sharpened sectional configuration defined by surfaces which converge toward one another at an acute angle substantially less than 90 degrees.

10. The combination comprising:

a body containing a passage;

a plunger mounted slidably in said passage for movement relative to said body along a predetermined axis, and having an end portion which is accessible from the outside of the body for manually pressing the plunger inwardly along said axis from a cord gripping position to a released position; and a spring yieldingly resisting such inward axial sliding movement of the plunger;

said body and plunger having apertures through which a cord or cords can extend generally transversely of said axis and which in said released position of the plunger are essentially opposite one another to free the cord or cords for longitudinal movement, and which are defined in part by relatively movable edges of the body and plunger between which the cord or cords are clamped in said gripping position of the plunger to lock the cord or cords against longitudinal movement;

said apertures in the body and plunger being of oblong cross sectional configuration having a smaller dimension in a direction parallel to said axis than in a plane transversely of the axis;

said body having opposite side walls containing two of said apertures of oblong section opposite one another with a third of the apertures formed in said plunger between said side walls;

said plunger having two of said edges at opposite sides thereof which are received closely adjacent said side walls of the body and which project farther toward said side walls than do axially inwardly adjacent portions of the plunger in a relation giving those edges as viewed in planes containing said axis sharpened sectional configurations defined by surfaces disposed at an acute angle to one another substantially less than 90 degrees;

said side walls of the body forming another pair of said edges at inner sides of the side walls closely adjacent the plunger and of sharpened sectional configuration defined by surfaces disposed at an acute angle to one another substantially less than 90 degrees.

11. The combination as recited in claim 10, in which said passage in the body is substantially cylindrical, and said plunger has a correspondingly externally cylindrical portion slidably engaging said passage.

12. The combination as recited in claim 11, in which said body has an externally spherical surface relative to which said axis extends essentially diametrically, said two apertures in said opposite side walls of the body being located at essentially diametrically opposite positions with respect to said spherical surface and offset 90 degrees from said axis.

13. The combination as recited in claim 12, in which said body has an enlargement projecting outwardly beyond said spherical surface in one axial direction, and said end portion of said plunger projects outwardly beyond said spherical surface in the opposite axial direction.

* * * * *